United States Patent [19]
Anthony, III et al.

[11] Patent Number: 5,213,913
[45] Date of Patent: May 25, 1993

[54] LATCHING ARRANGEMENT FOR BATTERY PACK

[75] Inventors: Philip M. Anthony, III, Lindenhurst, Ill.; Edward S. Wahoski; Michael A. Norris, both of Kenosha, Wis.

[73] Assignee: Snap-on Tools Corporation, Kenosha, Wis.

[21] Appl. No.: 838,901

[22] Filed: Feb. 21, 1992

[51] Int. Cl.$^5$ .................. H01M 2/10; E05C 19/06; B25B 21/00
[52] U.S. Cl. .................. 429/97; 429/98; 429/123; 292/DIG. 38; 292/244; 292/87; 30/500; 30/DIG. 1
[58] Field of Search .................. 429/97, 96, 98, 100, 429/151, 123; 30/500, DIG. 1; 292/253, 254, 341.15, 341.17, DIG. 38, 244, 87, 80

[56] References Cited

U.S. PATENT DOCUMENTS

| | | |
|---|---|---|
| 3,186,878 | 6/1985 | Filander . |
| 3,251,110 | 5/1966 | Hedu . |
| 3,844,000 | 10/1974 | Hedu . |
| 3,999,110 | 12/1976 | Ramstrom et al. . |
| 4,582,219 | 4/1986 | Mortensen et al. ........... 292/80 X |
| 4,616,169 | 10/1986 | Proffitt . |
| 4,751,452 | 6/1988 | Kilmer et al. . |
| 4,871,629 | 10/1989 | Bunyea . |
| 4,904,549 | 2/1990 | Goodwin et al. . |

OTHER PUBLICATIONS

Operating Instructions for and photographs of Panasonic EY574 Cordless Tool using EY970 Battery Pack (No Date Available).
Specification sheet for Panasonic Model Nos. EY571B and EY574B Cordless Electric Power Tools using EY970 Battery Pack (No Date Available).
True Value advertisement for Master Mechanical Cordless Electric Tools, Model Nos. MMRD904E3 and MMRD703E3. (No Date Available).
Photographs of Hitachi Model WH8D1 Cordless Impact Wrench. (No Date Available).

*Primary Examiner*—John S. Maples
*Attorney, Agent, or Firm*—Emrich & Dithmar

[57] ABSTRACT

A cordless electric device has a main body portion extending along an axis and a handle portion extending at an obtuse angle with respect to the axis, the handle portion receiving therein along a second axis a battery pack. The device has a two-part housing, with the parts respectively defining the front and rear of the body and handle portions. The front housing part has latching shoulders respectively disposed on the opposite sides thereof, with each defining a first latching surface disposed substantially parallel to the first axis, while the battery pack has two identical latching members respectively disposed on opposite sides thereof and each resiliently displaceable between latching and release positions, each latching member having two second latching surfaces thereon in a V-shaped configuration, so that one of said second latching surfaces on each of said latching members is disposed substantially parallel to the first axis for engagement with the first latching surface of the corresponding latching shoulder to latch the battery back in place on the device. The latching members are interchangeable and molding of the forward housing part is facilitated.

18 Claims, 2 Drawing Sheets

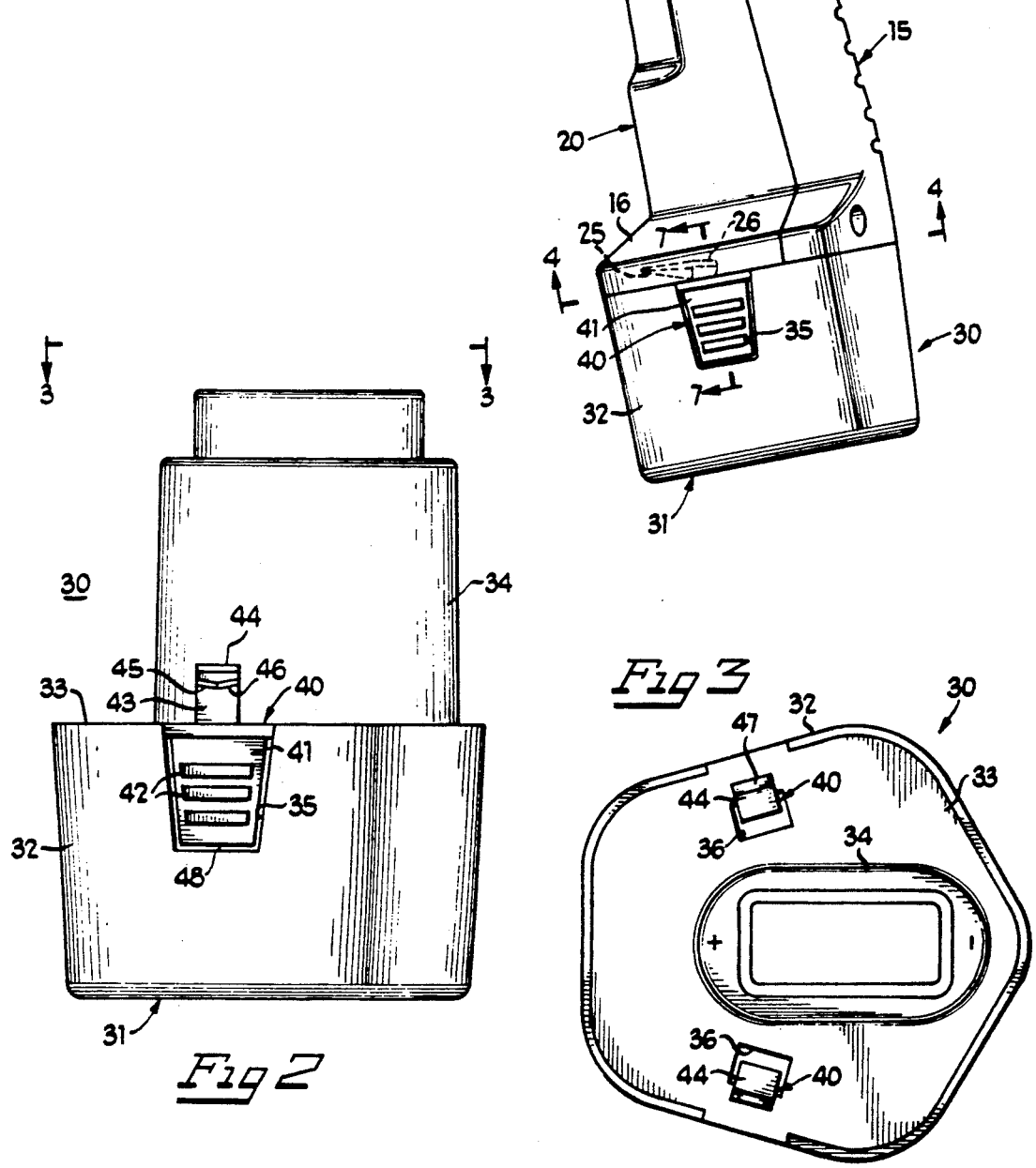

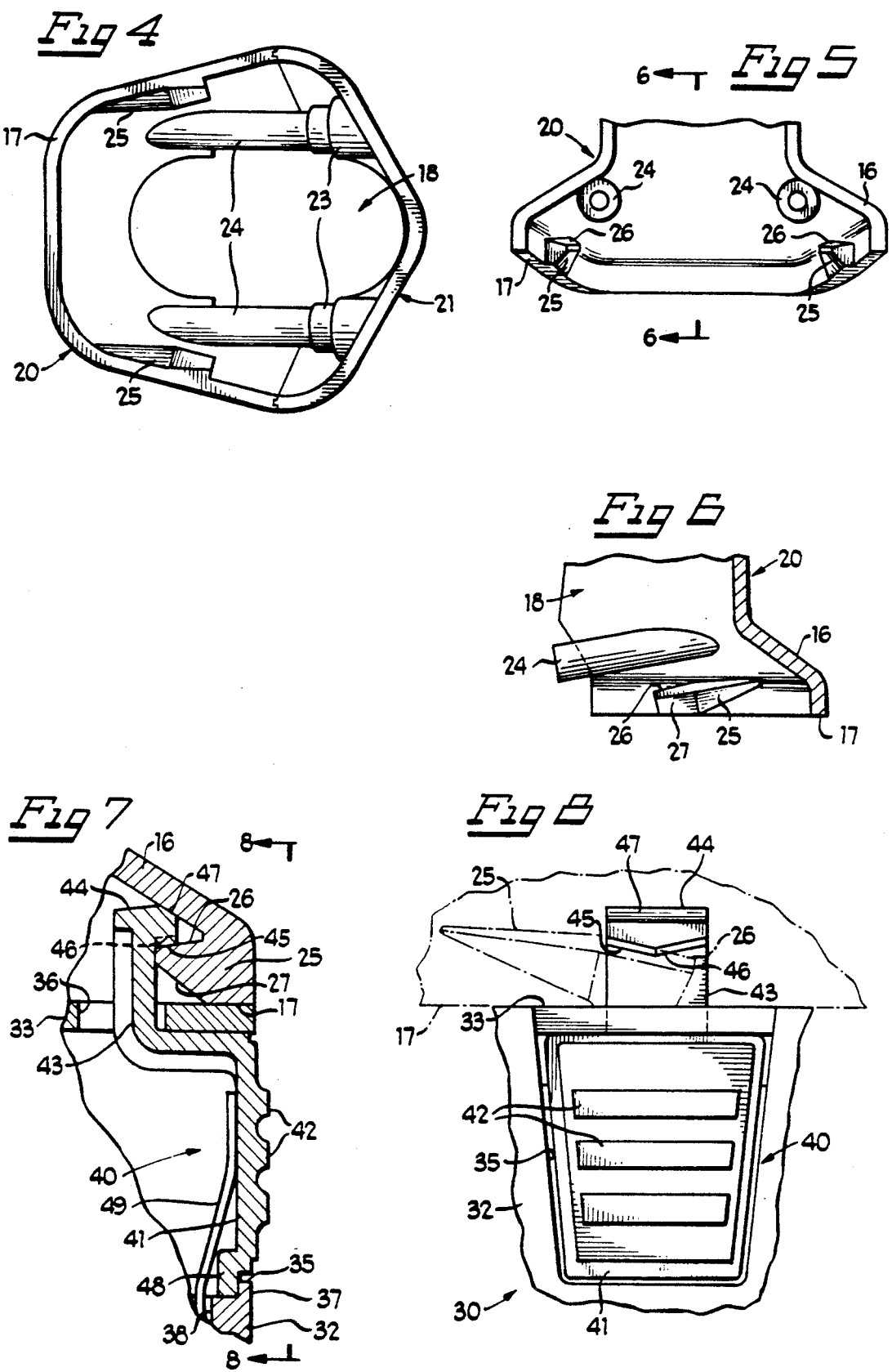

LATCHING ARRANGEMENT FOR BATTERY PACK

BACKGROUND OF THE INVENTION

1. Field of the Invention

The present invention relates to latching arrangements for latching battery packs to cordless electric devices, and has particular application to electric devices having two-part molded housings.

1. Description of the Prior Art

Battery packs for powering cordless electric devices, such as portable drills, impact wrenches and the like, are well known. It has been found convenient to have the battery packs releasably mounted in the cordless devices, such as in the handle portions thereof, with a quick release type of latching arrangement so that the battery packs can be easily removed for recharging. Typically such electric devices have housings comprising two interconnected molded plastic parts. Ergonomic design of the handle portion of such devices entails a substantial angle, typically somewhat greater than 90°, between the axis of the main body or barrel portion of the tool and the handle portion.

Commonly, the battery pack is insertable into the distal end of the handle portion along the handle axis, which is inclined at an obtuse angle with respect to the axis of the main body or barrel portion. The battery pack may have a pair of latching members resiliently displaceable between latching and release positions, for engagement with corresponding latching shoulders on opposite sides of the handle portion of the device. Typically, the latching surfaces of the latching members and latching shoulders are disposed substantially perpendicular to the axis of the handle portion of the device. This does not present any difficulty in prior art tools wherein the two housing parts are split side-to-side.

However, it has been found desirable, for aesthetic purposes, to have the two housing parts split front to back, i.e., with the front of the barrel portion and the front of the handle portion being molded as one piece and the rear of the barrel portion and the rear of the handle portion being molded as a second piece. In such an arrangement, where the handle portion is not perpendicular to the barrel portion, the provision of latching surfaces on the handle portion which are perpendicular to its axis complicates the molding process. If it is attempted to maintain the latching shoulder surfaces parallel to the axis of the barrel portion of the housing to simplify molding, this necessitates the use of two different latching members on the opposite sides of the battery pack, which increases inventory and complicates assembly.

SUMMARY OF THE INVENTION

It is a general object of the invention to provide an improved latching arrangement for a battery pack of a cordless electric device, which avoids the disadvantages of prior latching arrangements while affording additional structural and operating advantages.

An important feature of the invention is the provision of a latching arrangement which is of relatively simple and economical construction and which is useable with a two-part front-back molded device housing.

In connection with the foregoing feature, another feature of the invention is the provision of a latching arrangement of the type set forth in which the device has a main body portion and a handle portion which are non-perpendicular with respect to each other, and wherein the housing parts are susceptible of relatively simple and inexpensive molding.

In connection with the foregoing feature, another feature of the invention is the provision of a latching arrangement of the type set forth, wherein the battery pack has two identical and interchangeable latching members respectively engageable with two latching shoulders on opposite sides of the device.

These and other features of the invention are attained by providing a latching arrangement for latching a battery pack in an operating position on an electric device having a body portion extending along an axis and a handle portion inclined with respect to the axis, the latching arrangement comprising: a latching shoulder on the handle portion having a first latching surface disposed substantially parallel to the axis, and a latching member on the battery pack displaceable between latching and release positions and resiliently biased to the latching position, the latching member having a second latching surface thereon engageable with the first latching surface when the latching member is in its latching position and the battery pack is in its operating position securely to latch the battery pack to the device.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a cordless electric power tool with a battery pack latched thereto by a latching arrangement constructed in accordance with and embodying the features of the present invention;

FIG. 2 is an enlarged side elevational view of the battery pack of FIG. 1;

FIG. 3 is a top plan view of the battery pack of FIG. 2;

FIG. 4 is an enlarged, bottom plan view of the handle of the tool of FIG. 1, taken generally along the line 4—4 therein, with the battery pack removed;

FIG. 5 is a fragmentary rear elevational view of the front housing part of the handle portion of FIG. 4, with the rear housing part removed and rotated 90° counterclockwise;

FIG. 6 is a fragmentary sectional view taken along the line 6—6 in FIG. 5;

FIG. 7 is an enlarged, fragmentary, sectional view taken along the line 7—7 in FIG. 1 and illustrating the latching arrangement of the present invention; and FIG. 8 is a fragmentary side elevational view of a latching member of the battery pack, taken generally along the line 8—8 in FIG. 7, with cooperating portions of the power tool shown in phantom.

DESCRIPTION OF THE PREFERRED EMBODIMENT

Referring to FIG. 1, there is illustrated a cordless electric power tool, generally designated by the numeral 10, which has a housing preferably molded of a suitable plastic material. The housing 11 includes a main body or barrel portion 12 which is generally tubular and extends along a longitudinal axis 13. Disposed within the barrel portion 12 is a suitable electric motor (not shown) having an output shaft 14 adapted for connection to associated tools such as sockets and bits in a known manner. The housing il also includes a handle portion 15 which extends downwardly from the barrel portion 12 generally along a second axis which is preferably disposed at an obtuse angle in the range of about 105° to the axis 13, for ergonomic reasons. Referring also to FIGS. 4-8, the handle portion 15 has an outwardly flared skirt end 16 provided with a peripheral end surface 17 which lies in a plane substantially perpendicular to the axis of the handle portion 15. The handle portion 15 defines therein a cavity 18 (FIGS. 4 and 6) which is open at the skirt end 16 of the handle portion 15. The tool 10 is provided with a trigger mechanism 19 mounted on the housing 11 adjacent to the junction between the handle portion 15 and the barrel portion 12 for actuating the tool 10, in a known manner.

The housing Il comprises two interconnected parts or sections, including a front housing section 20, which forms the front of the barrel portion 12 and the front of the handle portion 15, and a rear housing section 21 which forms the rear of the barrel portion 12 and the rear of the housing portion 15. Preferably, the front and rear housing sections 20 and 21 are interconnected by suitable fasteners (not shown). In this regard, the rear housing section 2 has a pair of tubular bosses 23 for receiving therethrough, and the front housing section 20 has a pair of elongated bosses 24 having axial bores therein which are respectively aligned with bosses 23 when the front and rear housing sections 20 and 21 are assembled, for receiving the fasteners.

Also formed on the skirt end 16 of the front housing section 20 are a pair of latching shoulders 25 (FIGS. 1 and 4-8), respectively disposed on opposite sides of the handle portion 15. Each of the latching shoulders 25 has a latching surface 26 thereon which is disposed substantially parallel to the axis 13 of the barrel portion 12. Each of the latching shoulders 25 also includes a cam surface 27 on its underside which is inclined with respect to the latching surface 26. Preferably, in molding the front housing section 20, the core pull-out direction is along the direction of the axis 13. The fact that the latching surfaces 26 are substantially parallel to the axis 13 (except for a slight draft angle of about 0.5°) greatly facilitates the molding operation.

The tool 10 is provided with a battery pack 30 having a generally cup-shaped body 31 including a peripheral side wall 32 which is generally pentagonal in transverse cross section, and is closed at the upper end thereof by an end wall 33. Integral with the end wall 33 and projecting upwardly therefrom is a post 34 which carries plug prongs (not shown) adapted for mating engagement with contacts (not shown) disposed in the cavity 18 in the handle portion 15, in a known manner. The battery pack 30 has a pair of apertures 35 formed in the side wall 32, respectively along opposite sides of the body 31 and respectively defined by lips 37 (FIG. 7) and a pair of apertures 36 formed in the end wall 33, respectively adjacent to the apertures 35, as can best be seen in FIGS. 2, 3, 7 and 8. Two narrow cavities 38 are formed in the body 31, respectively adjacent to the lower ends of the apertures 35 (FIG. 7). It will be appreciated that the battery pack 30 contains a suitable battery power source, which is preferably of the rechargeable type, all in a known manner. In use, the post 34 of the battery pack 30 is insertable into the cavity 18 in the handle portion 15 generally along the axis thereof to a mounted position, illustrated in FIG. 1, wherein the end wall 33 bears against the peripheral end surface 17 of the handle portion 15. In this mounted position the plug prongs on the post 34 are plugged into the contacts in the handle portion 15 to provide power to the tool 11.

In order to secure the battery pack 30 to the handle portion 15, the body 31 is provided with two substantially identical latching members 40, which are preferably molded of a suitable plastic. Each of the latching members 40 has a button portion 41 which is disposed in a corresponding one of the side wall apertures 35 and is provided on its outer surface with ribs 42 to facilitate gripping by an operator's thumb or finger. Each latching member 40 also includes a generally L-shaped finger 43 unitary with the button portion 41 at its upper end and projecting upwardly through the associated one of the end wall apertures 36, as can best be seen in FIGS. 3 and 7. The finger 43 is provided at its upper end with a head 44 which projects slightly outwardly toward the button portion 41 and is provided along its bottom side with a pair of latching surfaces 45 and 46 which are arranged in a shallow V-shaped configuration. The latching member 40 has a peripheral flange 48 which bears against the inner surface of the lip 37 to prevent removal through the associated aperture 35. The latching member 40 is resiliently biased against the lip 37 by a leaf spring 49 (FIG. 7) one end of which is seated in the associated cavity 38 and the other end of which bears against the rear surface of the button portion 41.

The portion of the finger 43 which extends upwardly above the end wall 33 projects generally parallel to the longitudinal axis of the battery pack 30, whereas the latching surfaces 45 and 46 are, respectively, inclined in opposite directions, but at substantially the same angle, with respect to that axis. Preferably, this angle is substantially the same as the angle between the latching surfaces 26 and the axis of the handle portion 15. Each of the latching members 40 is manually deflectable inwardly, against the bias of the leaf spring 49, by an operator's thumb or finger to a release position (not shown), in a well-known manner, the depth of the end wall apertures 36 being sufficient to accommodate this movement. Each latching member head 44 is also provided with a cam follower surface 47 at its upper outer end.

In operation, when it is desired to mount the battery pack 30 in place, the post 34 is inserted up into the cavity 18. The cam follower surfaces 47 on the latching members 40 will respectively cam past the cam surfaces 27 to clear the latching shoulders 25, thereby permitting the battery pack 30 to move to its mounted operating position, wherein the end wall 33 engages the end surface 17 of the handle portion 15. As the battery pack 30 reaches this operating position, the heads 44 of the latching members 40 resiliently snap back to their latching positions, into latching engagement with the latching surfaces 26, as illustrated in FIG. 7, securely to latch the battery pack 30 in place.

More specifically, it will be appreciated that, when the battery pack 30 is disposed in its operating position, the forward one of the latching surfaces 45 and 46 will be disposed substantially parallel to the latching surfaces 26 for firm latching engagement therewith, as can be seen in FIGS. 7 and 8. It is a significant aspect of the invention that, because the latching surfaces 45 and 46 are both inclined at the same angle, but in opposite directions, with respect to the axis of the latching member 40, the latching member 40 can be used on either side of the battery pack 30 in a reversible manner. If it is used on one side, the latching surface 45 will engage the latching surface 26, and if it is used on the other side, the latching surface 46 will engage the latching surface 26. This greatly facilitates assembly of the battery pack 30 and reduces the number of different parts therein.

When it is desired to remove the battery pack 30 from the handle portion 15, such as for recharging of the battery, the button portions 41 are depressed, thereby resiliently displacing the fingers 43 to their release positions clear of the latching shoulders 25, to free the battery pack 30.

From the foregoing, it can be seen that there has been provided an improved latching arrangement for a cordless electric device which affords simple and inexpensive molding of the device housing, even in a front-back, two-part housing arrangement, and provides for interchangeable latching members on the battery pack.

We claim:

1. A latching arrangement for latching a battery pack in an operating position on an electric device having a body portion extending along an axis and a handle portion inclined with respect to the axis, said handle portion including forward and rearward housing parts interconnected along opposite sides thereof, said latching arrangement comprising: plural latching shoulders on the sides of the housing parts each having a first latching surface disposed substantially parallel to the axis, and plural latching members on the battery pack each displaceable between latching and release positions and resiliently biased to the latching position, each latching member having a second latching surface thereon engageable with said first latching surface of a corresponding one of said latching shoulders when said latching member is in its latching position and the battery pack is in its operating position securely to latch the battery pack to the device.

2. The latching arrangement of claim 1, wherein the handle portion has two of said latching shoulders thereon and the battery pack has two of said latching members thereon respectively engageable with said latching shoulders.

3. The latching arrangement of claim 2, wherein said latching shoulders are respectively disposed on opposite sides of the handle portion and said latching members are respectively disposed on opposite sides of the battery pack.

4. The latching arrangement of claim 1, wherein said latching shoulders are disposed on the forward one of said housing parts.

5. The latching arrangement of claim 1, wherein said latching members are manually displaceable to their release positions.

6. The latching arrangement of claim 1, wherein the handle portion is disposed at an obtuse angle with respect to the axis.

7. A latching arrangement for latching a battery pack to an electric device wherein the battery pack is insertable into the device along an axis to an operating position, said latching arrangement comprising: two latching shoulders respectively disposed on opposite sides of the device, each of said shoulders having a first latching surface inclined with respect to the axis at a predetermined angle, and a latching member disposed on one side of the battery pack and adapted for cooperation with the latching shoulder on the corresponding side of the device, said latching member being displaceable between latching and release positions and resiliently biased to the latching position, said latching member having two second latching surfaces thereon respectively inclined with respect to the axis on opposite sides thereof at said predetermined angle, whereby when the battery pack is in its operating position one of said second latching surfaces is engageable with said first latching surface of the one of said shoulders on the corresponding side of the device irrespective of the side of the battery pack on which said latching member is disposed.

8. The latching arrangement of claim 7, wherein said two second latching surfaces are disposed in a substantially V-shaped configuration.

9. The latching arrangement of claim 7, wherein the battery pack includes two of said latching members respectively engageable with said latching shoulders.

10. The latching arrangement of claim 9, wherein said two latching members are substantially identical in construction.

11. The latching arrangement of claim 9, wherein said latching member extends from the battery pack substantially parallel to the axis when the battery pack is disposed in its operating position.

12. A latching arrangement for latching a battery pack on an electric device having a body portion extending along a first axis and a handle portion inclined with respect to the first axis, wherein the battery pack is insertable into the handle portion of the device along a second axis to an operating position, said latching arrangement comprising: two latching shoulders respectively disposed on opposite sides of the device, each of said shoulders having a first latching surface disposed substantially parallel to the first axis, and a latching member disposed on one side of the battery pack and adapted for cooperation with the latching shoulder on the corresponding side of the device, said latching member being displaceable between latching and release positions and resiliently biased to the latching position, said latching member having two second latching surfaces thereon respectively inclined with respect to the second axis on opposite sides thereof at a predetermined angle, said predetermined angle being such that when the battery pack is in its operating position one of said second latching surfaces is substantially parallel to and engageable with said first latching surface on the one of said shoulders on the corresponding side of the device irrespective of the side of the battery pack on which said latching member is disposed.

13. The latching arrangement of claim 12, wherein the device includes a housing having two interconnected parts.

14. The latching arrangement of claim 13, wherein said two housing parts respectively form forward and rearward portions of the device.

15. The latching arrangement of claim 14, wherein said latching shoulder is disposed on the forward one of said housing parts.

16. The latching arrangement of claim 12, wherein the battery pack includes two of said latching members respectively engageable with said latching shoulders.

17. The latching arrangement of claim 12, wherein said two second latching surfaces are disposed in a substantially V-shaped configuration.

18. The latching arrangement of claim 12, wherein the second axis is disposed at an obtuse angle with respect to the first axis.

* * * * *

UNITED STATES PATENT AND TRADEMARK OFFICE
CERTIFICATE OF CORRECTION

PATENT NO. : 5,213,913
DATED : May 25, 1993
INVENTOR(S) : Philip M. Anthony III et al.

It is certified that error appears in the above-indentified patent and that said Letters Patent is hereby corrected as shown below:

ON THE TITLE PAGE:

[56] Other Publications, in the True Value reference, "Mechanical" should be --Mechanic--.

Column 6, line 31, "9" should be --7--.

Signed and Sealed this

Fifteenth Day of February, 1994

Attest:

BRUCE LEHMAN

Attesting Officer     Commissioner of Patents and Trademarks